(12) United States Patent
Richardson

(10) Patent No.: US 10,780,840 B1
(45) Date of Patent: Sep. 22, 2020

(54) CELLPHONE STAND DRAWER APPARATUS

(71) Applicant: Tammie Richardson, Wesley Chapel, NC (US)

(72) Inventor: Tammie Richardson, Wesley Chapel, NC (US)

(*) Notice: Subject to any disclaimer, the term of this patent is extended or adjusted under 35 U.S.C. 154(b) by 0 days.

(21) Appl. No.: 16/527,882

(22) Filed: Jul. 31, 2019

(51) Int. Cl.
*B60R 7/04* (2006.01)
*B60R 11/00* (2006.01)
*B60R 11/02* (2006.01)

(52) U.S. Cl.
CPC ... *B60R 11/0241* (2013.01); *B60R 2011/0003* (2013.01); *B60R 2011/008* (2013.01); *B60R 2011/0075* (2013.01)

(58) Field of Classification Search
CPC .............. B60R 7/04; B60R 2011/0007; B60R 2011/0075; B60R 2011/0084
USPC .... 224/483, 485, 281, 929; 296/37.12, 37.8; 206/565, 561, 562, 564; 312/322, 323, 312/325, 326, 327, 348.4
See application file for complete search history.

(56) References Cited

U.S. PATENT DOCUMENTS

| | | | | |
|---|---|---|---|---|
| 5,457,745 A * | 10/1995 | Wang | ................... | B60R 11/0241 379/426 |
| 5,556,017 A * | 9/1996 | Troy | ................... | B60R 11/0241 224/549 |
| 5,974,332 A * | 10/1999 | Chung | ................ | B60R 11/0241 455/569.2 |
| 5,996,866 A * | 12/1999 | Susko | ................. | B60R 11/0241 224/281 |
| 6,056,175 A * | 5/2000 | Mieglitz | ............. | B60R 11/0241 224/282 |
| 6,491,194 B2 * | 12/2002 | Marvin | ............... | B60R 11/0241 224/247 |
| 7,469,951 B2 * | 12/2008 | Welschholz | .............. | B60R 7/06 296/37.12 |
| 7,708,328 B2 * | 5/2010 | Doom | ....................... | B60R 7/06 206/565 |
| 7,900,988 B2 * | 3/2011 | Ryu | .................... | B60R 11/0235 224/483 |
| 8,136,897 B2 * | 3/2012 | Mascari | ............... | A47B 46/005 16/342 |
| 8,256,814 B2 * | 9/2012 | Thorsell | .................... | B60R 7/04 296/24.34 |
| 8,439,417 B2 * | 5/2013 | Andersson | ............ | B60K 37/06 296/37.12 |
| 8,646,824 B2 * | 2/2014 | Da Costa Pito | ........ | B60R 11/02 296/37.12 |
| 8,857,881 B2 * | 10/2014 | Shimozaki | ............. | B60N 3/102 224/281 |
| 9,115,515 B1 * | 8/2015 | South | ...................... | E05B 77/54 |

(Continued)

*Primary Examiner* — Peter N Helvey
*Assistant Examiner* — Lester L Vanterpool

(57) ABSTRACT

A cellphone stand drawer apparatus for supporting a cellphone in a vehicle includes a housing having a housing interior. A drawer track is coupled to the housing and a pair of drawer sides is coupled to the drawer track. A drawer front and a base are coupled to the pair of drawer sides. An opener arm moves the pair of drawer sides from a closed position to an alternate open position. A touch latch is coupled to the housing and the drawer front. A cradle axle is coupled to the pair of drawer sides and a pair of cradle arms is coupled to the cradle axle. The pair of cradle arms pivots and slides on the cradle axle to secure a cellphone both within the drawer apparatus in the closed position and standing in the open position.

8 Claims, 4 Drawing Sheets

(56) References Cited

U.S. PATENT DOCUMENTS

| | | | | |
|---|---|---|---|---|
| 9,283,898 B2 * | 3/2016 | Azadi | .................... | B60R 7/06 |
| D765,016 S * | 8/2016 | Azadi | ...................... | D12/415 |
| 9,403,490 B2 * | 8/2016 | LaFargue | ............ | B60R 11/0241 |
| 9,783,124 B2 * | 10/2017 | Catlin | ................. | B60R 11/0241 |
| 2012/0049558 A1 * | 3/2012 | Souillac | ................. | B60R 11/00 |
| | | | | 296/37.12 |
| 2014/0339847 A1 * | 11/2014 | Brunard | ................. | B60R 11/02 |
| | | | | 296/37.12 |
| 2017/0072873 A1 * | 3/2017 | Brunard | ............. | B60R 11/0241 |

* cited by examiner

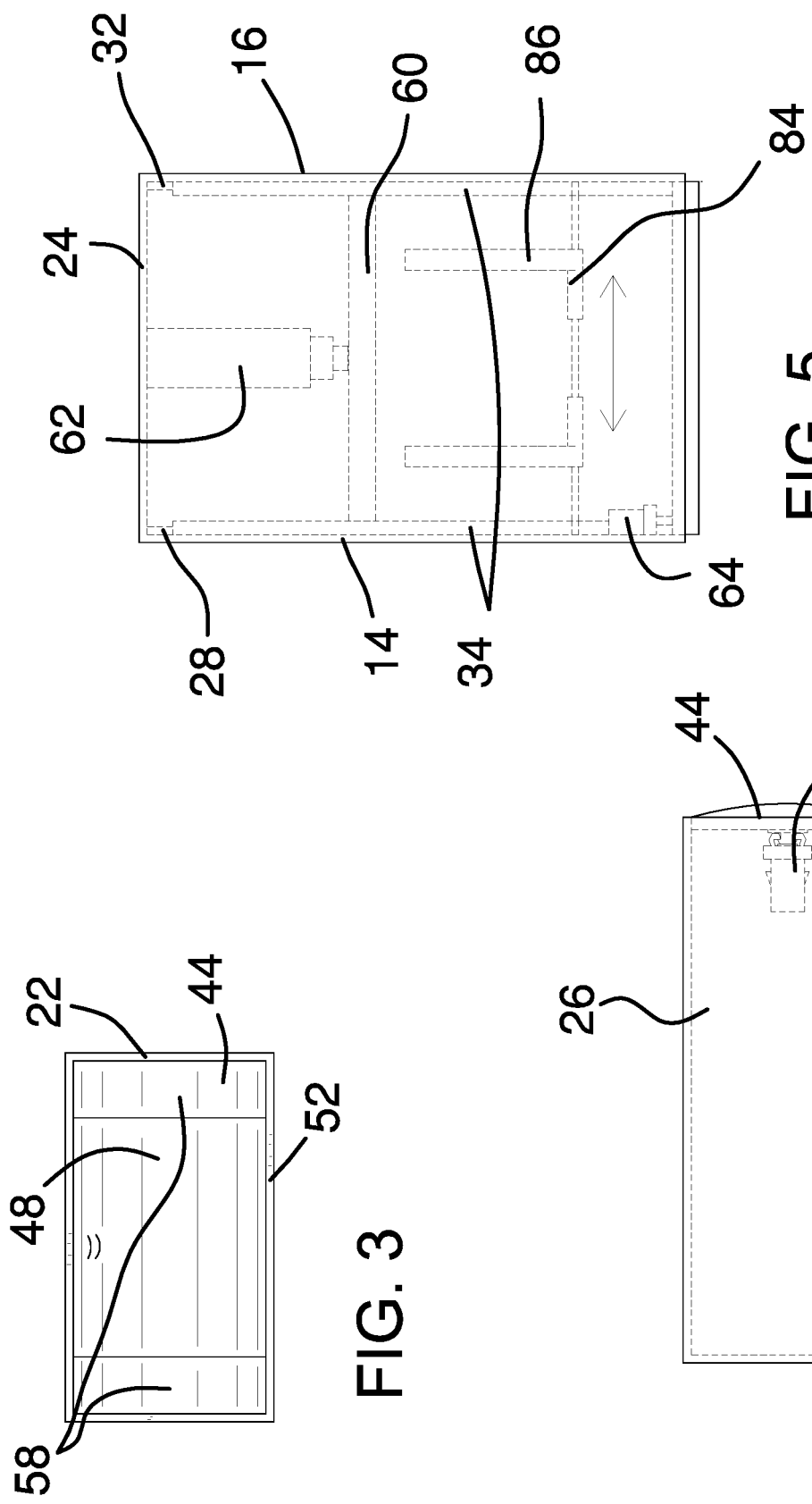

CELLPHONE STAND DRAWER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cellphone holders and more particularly pertains to a new cellphone holder for supporting a cellphone in a vehicle.

(2) Description of Related Art Including Information Disclosed Under 37 CFR 1.97 and 1.98

The prior art relates to cellphone holders.

BRIEF SUMMARY OF THE INVENTION

An embodiment of the disclosure meets the needs presented above by generally comprising a housing having a housing left side, a housing right side, a housing top side, a housing bottom side, an open housing front side, and a housing back side defining a housing interior. A drawer track is coupled to the housing and comprises a left track and a right track coupled to the housing left side and the housing right side, respectively, within the housing interior. A pair of drawer sides is coupled to the drawer track. The pair of drawer sides comprises a left drawer side and a right drawer side slidably coupled to the left track and the right track, respectively. The pair of drawer sides slide between a closed position within the housing interior and an open position extending from the housing front side. A drawer front is coupled to the pair of drawer sides. The drawer front is perpendicularly coupled to a distal end of each of the pair of drawer sides. The drawer front conforms to the housing front side to cover the housing interior with the drawer sides in the closed position. A brace is coupled to the pair of drawer sides. The brace is perpendicularly coupled between the left drawer side and the right drawer side. An opener arm is coupled to the brace and the housing and extends from the housing back side to the brace and is telescopic and spring-loaded. The opener arm moves the pair of drawer sides from the closed position to the open position. A touch latch is coupled to the housing and the drawer front. The touch latch comprises a male engagement member coupled within the housing interior proximal the housing front side and a female engagement member coupled to an inner face of the drawer front. The male engagement member and the female engagement member are selectively engageable to secure the pair of drawer sides in the closed position. A cradle axle is coupled to the pair of drawer sides. The stand axle perpendicularly extends between the left drawer side and the right drawer side proximal the respective distal ends. A pair of cradle arms is coupled to the cradle axle. Each of the pair of cradle arms has a tubular portion and an extension portion. The tubular portion is slidably and pivotably coupled around the cradle axle. The extension portion extends from the tubular portion. The pair of cradle arms pivots on the cradle axle between a down position with the extension portion of each cradle arm parallel with the drawer track and an up position with the extension portion of each cradle arm perpendicular with the drawer track. The pair of cradle arms is configured to secure a cellphone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front elevation view of an embodiment of the disclosure.

FIG. 4 is a side elevation view of an embodiment of the disclosure.

FIG. 5 is a top plan view of an embodiment of the disclosure.

DETAILED DESCRIPTION OF THE INVENTION

Figure 1:
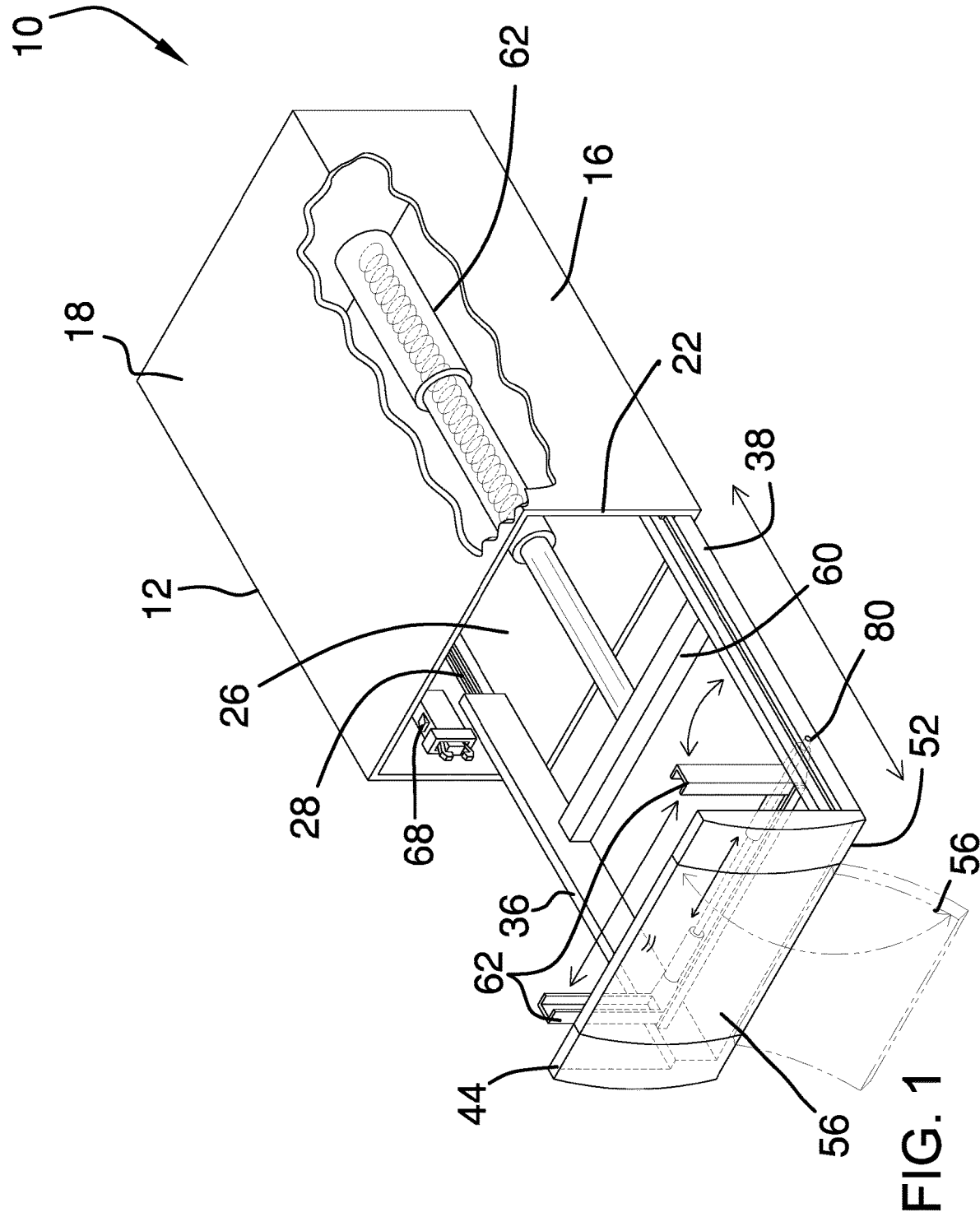
FIG. 1 is an isometric view of a cellphone stand drawer apparatus according to an embodiment of the disclosure.
Figure 2:
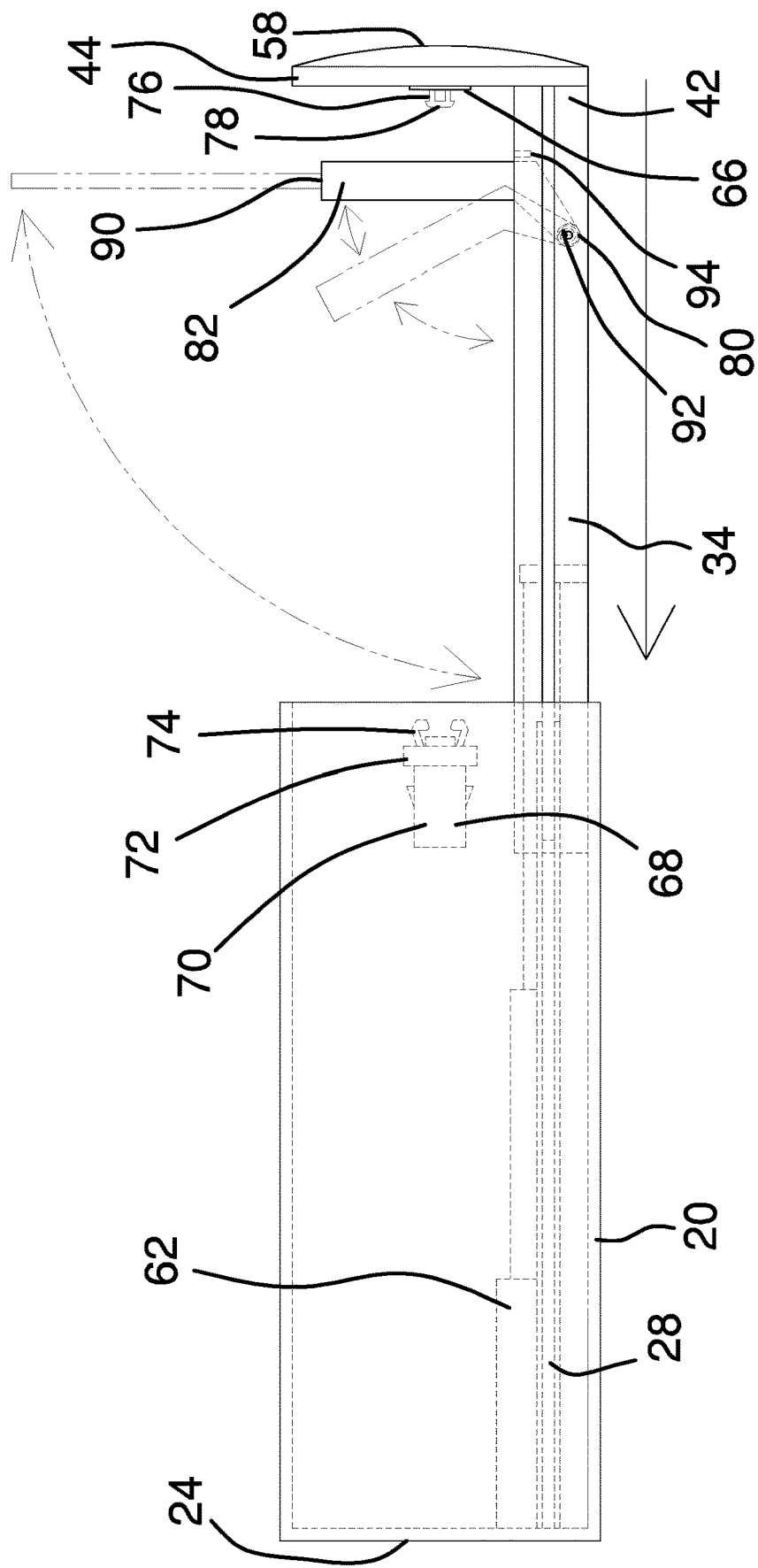
FIG. 2 is an in-use view of an embodiment of the disclosure.
Figure 6:
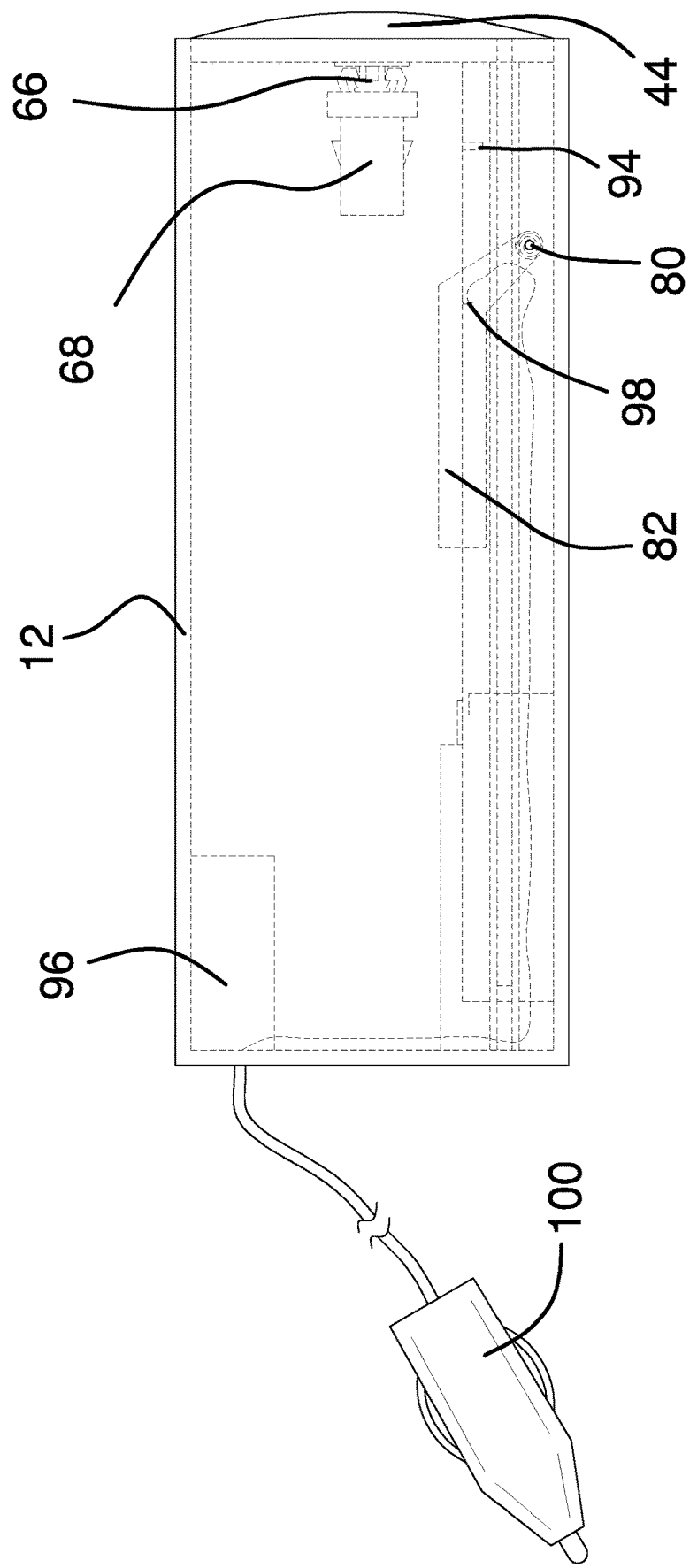
FIG. 6 is a side elevation view of an embodiment of the disclosure.

With reference now to the drawings, and in particular to FIGS. 1 through 6 thereof, a new cellphone holder embodying the principles and concepts of an embodiment of the disclosure and generally designated by the reference numeral 10 will be described.

As best illustrated in FIGS. 1 through 6, the cellphone stand drawer apparatus 10 generally comprises a housing 12 having a housing left side 14, a housing right side 16, a housing top side 18, a housing bottom side 20, an open housing front side 22, and a housing back side 24 defining a housing interior 26. The housing 12 is configured to be installed into a dash panel of a vehicle or to be mounted within the vehicle interior of the vehicle. A drawer track 28 is coupled to the housing 12. The drawer track 28 comprises a left track 30 and a right track 32 coupled to the housing left side 14 and the housing right side 16, respectively, within the housing interior 26. A pair of drawer sides 34 is coupled to the drawer track 28. The pair of drawer sides 34 comprises a left drawer side 36 and a right drawer side 38 slidably coupled to the left track 30 and the right track 32, respectively. The pair of drawer sides 34 slide between a closed position 40 within the housing interior 26 and an open position 42 extending from the housing front side 22. The drawer sides 34 may slidingly contact the housing bottom side 20. A drawer front 44 is coupled to the pair of drawer sides 34. The drawer front 44 is perpendicularly coupled to a distal end 46 of each of the pair of drawer sides 34. The drawer front 44 conforms to the housing front side 22 to cover the housing interior 26 with the drawer sides 34 in the closed position 40. The drawer front 44 comprises a medial portion 48 and a pair of lateral portions 50. The medial portion 48 is pivotably coupled to a bottom edge 52 of the drawer front 44. The medial portion 48 pivots between a folded position 54 aligned with the pair of lateral portions 50 and an extended position 56 hanging below the bottom edge 52. An outer face 58 of the drawer front 44 is rounded.

A brace 60 is coupled to the pair of drawer sides 34. The brace 60 is perpendicularly coupled between the left drawer side 36 and the right drawer side 38. An opener arm 62 is coupled to the brace 60 and the housing 12. The opener arm 62 extends from the housing back side 24 to the brace 60 and is telescopic and spring-loaded. The opener arm 62 moves the pair of drawer sides 34 from the closed position 40 to the open position 42. A touch latch 64 is coupled to the housing 12 and the drawer front 44. The touch latch 64 comprises a male engagement member 66 coupled within the housing interior 26 proximal the housing front side 22 and a female engagement member 68 coupled to an inner face 70 of the drawer front 44. The male engagement member 66 and the female engagement member 68 are selectively engageable to secure the pair of drawer sides 34 in the closed position 40. The male engagement member 66 may have a rectangular body portion 70, a rectangular neck portion 72, and a pair of curved latch arms 74 extending from within the body portion 70 through the neck portion 72. The female engagement member 68 may have a pair of attachment arms 76 perpendicularly extending from the inner face 70 and a catch 78 perpendicularly coupled to the pair of attachment arms 76. When the drawer front 44 is pressed the male engagement member 66 and the female engagement member 68 disengage to allow the opener arm 62 to move the pair of drawer sides 34 to the open position 42.

A cradle axle 80 is coupled to the pair of drawer sides 34. The cradle axle 80 perpendicularly extends between the left drawer side 36 and the right drawer side 38 proximal the respective distal ends 46. A pair of cradle arms 82 is coupled to the cradle axle 80. Each of the pair of cradle arms 82 has a tubular portion 84 and an extension portion 86. The tubular portion 84 is slidably and pivotably coupled around the cradle axle 80. The extension portion 86 extends from the tubular portion 84. The pair of cradle arms 82 pivots on the cradle axle 80 between a down position 88 with the extension portion 86 of each cradle arm 82 parallel with the drawer track 28 and an up position 90 with the extension portion 86 of each cradle arm 82 perpendicular with the drawer track 28.

Depending upon placement of the apparatus 10 within the vehicle, the pair of cradle arms 82 in the up position 90 may not be fully perpendicular. The tubular portion 84 of each of the pair of cradle arms 82 has a spring 92. The spring 92 of each cradle arm 82 moves the pair of cradle arms 82 from the down position 88 to the up position 90. The pair of cradle arms 82 is configured to secure a cellphone. The extension portion 86 of each of the pair of cradle arms 82 has a squared U-shape profile and is configured to secure a cellphone front and a cellphone back of the cellphone. A cradle stop 94 is coupled to the pair of drawer sides 34. The cradle stop 94 perpendicularly extends between the left drawer side 36 and the right drawer side 38 proximal the drawer front 44. The cradle stop 94 contacts the extension portion 86 of each of the pair of cradle arms 82 in the up position 90. A charger 96 is coupled to the housing 12. The charger 96 has a charger contact 98 integrated into the pair of cradle arms 82 and a DC power plug 100 configured to connect to a cigarette lighter of the vehicle. The charger contact 98 may be a power cord or a wireless charging pad.

In use, the user pushes outer face 58 of the drawer front 44 to disengage the touch latch 64 allowing the opener arm 62 to move the pair of drawer sides 34 from the closed position 40 to the open position 42. The pair of cradle arms 82 is adjusted to receive the cellphone in the desired position. The medial portion 48 of the drawer front 44 is moved to the extended position 56 to allow access to the cellphone. The pair of cradle arms 82 may then be folded back to the down position 88 and the pair of drawer sides 34 moved to the closed position 40 to store the cellphone within the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellphone stand drawer apparatus comprising:
   a housing, the housing having a housing left side, a housing right side, a housing top side, a housing bottom side, an open housing front side, and a housing back side defining a housing interior;
   a drawer track coupled to the housing, the drawer track comprising a left track and a right track coupled to the housing left side and the housing right side, respectively, within the housing interior;

a pair of drawer sides coupled to the drawer track, the pair of drawer sides comprising a left drawer side and a right drawer side slidably coupled to the left track and the right track, respectively, the pair of drawer sides sliding between a closed position within the housing interior and an open position extending from the housing front side;

a drawer front coupled to the pair of drawer sides, the drawer front being perpendicularly coupled to a distal end of each of the pair of drawer sides, the drawer front conforming to the housing front side to cover the housing interior with the drawer sides in the closed position;

a brace coupled to the pair of drawer sides, the brace being perpendicularly coupled between the left drawer side and the right drawer side;

an opener arm coupled to the brace and the housing, the opener arm extending from the housing back side to the brace and being telescopic and spring-loaded, the opener arm moving the pair of drawer sides from the closed position to the open position;

a touch latch coupled to the housing and the drawer front, the touch latch comprising a male engagement member coupled within the housing interior proximal the housing front side and a female engagement member coupled to an inner face of the drawer front, the male engagement member and the female engagement member being selectively engageable to secure the pair of drawer sides in the closed position;

a cradle axle coupled to the pair of drawer sides, the cradle axle perpendicularly extending between the left drawer side and the right drawer side proximal the respective distal ends; and a pair of cradle arms coupled to the cradle axle, each of the pair of cradle arms having a tubular portion and an extension portion, the tubular portion being slidably and pivotably coupled around the cradle axle, the extension portion extending from the tubular portion, the pair of cradle arms pivoting on the cradle axle between a down position with the extension portion of each cradle arm parallel with the drawer track and an up position with the extension portion of each cradle arm perpendicular with the drawer track, the pair of cradle arms being configured to secure a cellphone.

2. The cellphone stand drawer apparatus of claim 1 further comprising an outer face of the drawer front being rounded.

3. The cellphone stand drawer apparatus of claim 1 further comprising the drawer front comprising a medial portion and a pair of lateral portions, the medial portion being pivotably coupled to a bottom edge of the drawer front, the medial portion pivoting between a folded position aligned with the pair of lateral portions and an extended position hanging below the bottom edge.

4. The cellphone stand drawer apparatus of claim 1 further comprising the extension portion of each of the pair of cradle arms having a squared U-shape profile and being configured to secure a cellphone front and a cellphone back of the cellphone.

5. The cellphone stand drawer apparatus of claim 1 further comprising the tubular portion of each of the pair of cradle arms having a spring, the spring of each cradle arm moving the pair of cradle arms from the down position to the up position.

6. The cellphone stand drawer apparatus of claim 1 further comprising a cradle stop coupled to the pair of drawer sides, the cradle stop perpendicularly extending between the left drawer side and the right drawer side proximal the drawer front, the cradle stop contacting the extension portion of each of the pair of cradle arms in the up position.

7. The cellphone stand drawer apparatus of claim 1 further comprising a charger coupled to the housing, the charger having a charger contact integrated into the pair of cradle arms and a DC power plug configured to connect to a cigarette lighter of the vehicle.

8. A cellphone stand drawer apparatus comprising:

a housing, the housing having a housing left side, a housing right side, a housing top side, a housing bottom side, an open housing front side, and a housing back side defining a housing interior;

a drawer track coupled to the housing, the drawer track comprising a left track and a right track coupled to the housing left side and the housing right side, respectively, within the housing interior;

a pair of drawer sides coupled to the drawer track, the pair of drawer sides comprising a left drawer side and a right drawer side slidably coupled to the left track and the right track, respectively, the pair of drawer sides sliding between a closed position within the housing interior and an open position extending from the housing front side;

a drawer front coupled to the pair of drawer sides, the drawer front being perpendicularly coupled to a distal end of each of the pair of drawer sides, the drawer front conforming to the housing front side to cover the housing interior with the drawer sides in the closed position, the drawer front comprising a medial portion and a pair of lateral portions, the medial portion being pivotably coupled to a bottom edge of the drawer front, the medial portion pivoting between a folded position aligned with the pair of lateral portions and an extended position hanging below the bottom edge, an outer face of the drawer front being rounded;

a brace coupled to the pair of drawer sides, the brace being perpendicularly coupled between the left drawer side and the right drawer side;

an opener arm coupled to the brace and the housing, the opener arm extending from the housing back side to the brace and being telescopic and spring-loaded, the opener arm moving the pair of drawer sides from the closed position to the open position;

a touch latch coupled to the housing and the drawer front, the touch latch comprising a male engagement member coupled within the housing interior proximal the housing front side and a female engagement member coupled to an inner face of the drawer front, the male engagement member and the female engagement member being selectively engageable to secure the pair of drawer sides in the closed position;

a cradle axle coupled to the pair of drawer sides, the cradle axle perpendicularly extending between the left drawer side and the right drawer side proximal the respective distal ends;

a pair of cradle arms coupled to the cradle axle, each of the pair of cradle arms having a tubular portion and an extension portion, the tubular portion being slidably and pivotably coupled around the cradle axle, the extension portion extending from the tubular portion, the pair of cradle arms pivoting on the cradle axle between a down position with the extension portion of each cradle arm parallel with the drawer track and an up position with the extension portion of each cradle arm perpendicular with the drawer track, the tubular portion of each of the pair of cradle arms having a spring, the spring of each cradle arm moving the pair of cradle arms from the down position to the up position, the pair of cradle arms being configured to secure a cellphone, the extension portion of each of the pair of cradle arms having a squared U-shape profile and being configured to secure a cellphone front and a cellphone back of the cellphone;

a cradle stop coupled to the pair of drawer sides, the cradle stop perpendicularly extending between the left drawer side and the right drawer side proximal the drawer front, the cradle stop contacting the extension portion of each of the pair of cradle arms in the up position; and a charger coupled to the housing, the charger having a charger contact integrated into the pair of cradle arms and a DC power plug configured to connect to a cigarette lighter of the vehicle.

* * * * *